April 17, 1945. H. A. ROSS 2,373,917

VACUUM BOTTLE CUP

Filed Oct. 15, 1942

INVENTOR

Harry A. Ross

By Ralph Burch

Attorney

Patented Apr. 17, 1945

2,373,917

UNITED STATES PATENT OFFICE 2,373,917

VACUUM BOTTLE CUP

Harry A. Ross, Calgary, Alberta, Canada

Application October 15, 1942, Serial No. 462,300

1 Claim. (Cl. 215—43)

This invention relates to cups for vacuum bottles and more particularly to a foldable handle for cups for vacuum bottles.

Vacuum bottles are generally provided with a cap which is screwed over the neck of the bottle to protect the stopper. These caps also serve as a cup whereby the contents of the bottle may be properly consumed. Notwithstanding the use to which the caps, or properly, the cups are put it has heretofore been undesirable to provide them with handles because of the difficulty in packing the vacuum bottle; in a lunch kit for example. The result has been that the user of the vacuum bottle has found it inconvenient and difficult to drink the hot liquid from the vacuum bottle because of the necessity of holding the cup by the body thereof. The material being in practically all cases highly heat conductive it is necessary to wait until the liquid has cooled so that the cup will be likewise cooled sufficiently to handle, in which case the liquid is then too cool for proper enjoyment.

This invention has for one of its main objects the provision of a vacuum bottle cup in combination with a handle attached thereto whereby the user of the vacuum bottle may consume the liquid, poured from the bottle into the cup, at any temperature suitable to his taste without discomfort to his hands.

This invention has for another main object the provision of a vacuum bottle cup in combination with a bottle attached thereto in which the said handle is foldable from a position substantially at right angles to the wall of the cup to a position against the wall of the cup whereby the vacuum bottle may be packed in a suitable and customary manner, as in a lunch kit for example.

Other objects are to provide a durable, attractive and inexpensive utilitarian device of the character set forth.

With the above noted and other objects in view which may appear as the description proceeds the invention resides in the novel construction, combination and arrangement of cooperating parts as hereinafter more specifically set forth, claimed and shown in the accompanying drawing forming part of this application, and in which:

Figure 1:
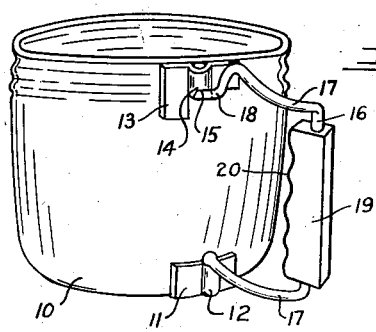
Fig. 1 is a perspective view of a vacuum bottle cup according to my invention.
Figure 2:
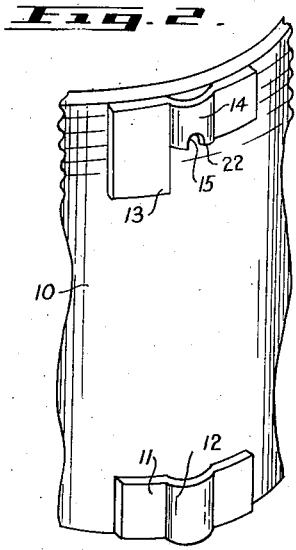
Fig. 2 is a fragmentary detailed view in perspective of the handle supporting brackets.

Referring more in detail to the drawing in which similar reference characters designate corresponding parts throughout the several views it will be seen that the invention consists of a vacuum bottle cup 10, of usual design. A lower bracket 11 is riveted, soldered or otherwise secured to the side of the cup 10, at its lower edge as indicated in Figures 1 and 2. The said bracket consists of a semi-tubular central portion 12, flanked by flanges whereby the bracket is secured to the cup 10.

An upper bracket 13 is riveted, soldered or otherwise secured to the side of the cup 10, at its upper peripheral edge as indicated in Figures 1 and 2. The said bracket consists of a semi-tubular central portion 14, flanked by flanges whereby the bracket is secured to the cup 10. The semi-tubular portion 14, has a notch 15, cut therein from the bottom edge for a purpose to be hereinafter explained in detail.

It is important to note that the portions 12, and 14, of the brackets lie in the same vertical plane although not necessarily in vertical alignment.

Figure 4:
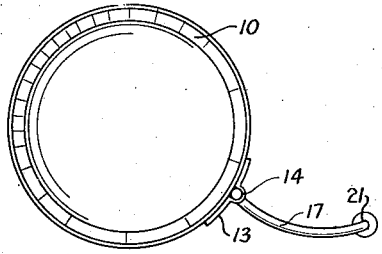
Fig. 4 is a top plan view of the device showing the handle in its open or operative position, in which the handle insulating member is of a slightly different construction than heretofore shown.

The handle is preferably formed from heavy gauge wire adapted to support the cup and contents without sagging. It consists of a straight intermediate portion 16, and upper and lower arcuate portions 17. The lower member 17, is terminated by a depending portion which is loosely received in the semi-tubular member 12, of the lower bracket. The upper member 17, is terminated by a substantially U-shaped indentation 18. The outer or free side of the U-shaped indentation is loosely received in the semi-tubular member 14, of the upper bracket. To provide suitable gripping and insulating means I cover the portion 16, of the handle with a rubber or fibrous sleeve 19, or the like which is oblong as seen in cross section and relatively thin to the end that, when folded, the handle will lie snugly against the side of the cup. The inside edge of the sleeve is rippled at 20, to provide a comfortable grip adequately insulated from the metal. As shown in Figure 4, I may simplify this construction by inserting the wire handle 16, through a length of rubber tubing 21 or the like with relatively successful results.

Figure 3:
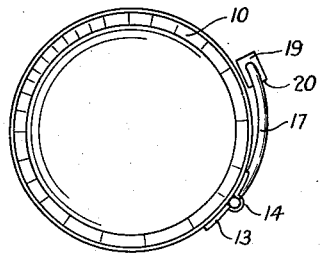
Fig. 3 is a top plan view of the device showing the handle in its folded or inoperative position.

From the foregoing description it will be seen that the handle is pivotally supported in the brackets 11, and 13, so that it may lie against the side of the cup as shown in Figure 3, it being understood that the arcuate portions 17, are curved substantially the same as a section of the cup 10.

From the inoperative position of Figure 3, the handle may be swung outward to the operative position of Figure 4. The handle is locked in this position when the upper arcuate portion 17, springs upward and is received in the notch 15, of the upper bracket. To close the handle, slight pressure exerted against the upper portion 17, preferably in a downward direction causes the U-shaped indentation to be lowered from the said notch and slide over the rounded edge 22, of the upper bracket whereupon the handle lies flush with the side of the cup. When it is opened it automatically assumes its locked position in the notch 15.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

A vacuum bottle cup comprising a circular body, upper and lower brackets secured to the side of said body, said brackets having intermediate bearings in axial alinement, the upper bearing being provided with a central notch in its lower edge, a wire handle including a vertical portion and upper and lower horizontal portions, the terminals of said horizontal portions being bent at right angles in opposite directions to provide trunnions adapted to pivotally engage in the bearings of said brackets, the upper horizontal portion being adapted to releasably engage in the notch of the upper bearing to hold said handle substantially at right angles to said body, said horizontal portions being arcuate shape to conform to the outer contour of the body whereby said handle lies flush with the side of the body when in inoperative position, and a gripping sleeve mounted on the vertical portion of the handle.

HARRY A. ROSS.